(12) United States Patent
Brachert et al.

(10) Patent No.: US 6,318,818 B1
(45) Date of Patent: Nov. 20, 2001

(54) METHOD FOR COMPENSATING THE TEMPERATURE DEPENDENCE OF AN INDUCTIVE RESISTANCE OF A VALVE COIL

(75) Inventors: Jost Brachert, Ditzingen; Eberhard Holl, Vaihingen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/622,740

(22) PCT Filed: Dec. 21, 1999

(86) PCT No.: PCT/DE99/04069

§ 371 Date: Nov. 13, 2000

§ 102(e) Date: Nov. 13, 2000

(87) PCT Pub. No.: WO00/37294

PCT Pub. Date: Jun. 29, 2000

(30) Foreign Application Priority Data

Dec. 22, 1998 (DE) .............................. 198 59 281

(51) Int. Cl.⁷ ...................................................... B60T 8/32
(52) U.S. Cl. ..................................... 303/119.2; 303/119.3
(58) Field of Search .............................. 303/119.2, 119.3, 303/191; 251/129.15, 129.21, 129.09

(56) References Cited

FOREIGN PATENT DOCUMENTS

| 41 07 978 | 9/1992 | (DE) . |
|---|---|---|
| 43 37 133 | 5/1995 | (DE) . |
| 196 06 965 | 8/1997 | (DE) . |
| 199 20 448 | 12/1999 | (DE) . |
| 0 538 600 | 11/1994 | (EP) . |
| 0 933 274 | 8/1999 | (EP) . |

OTHER PUBLICATIONS

Jonner et al., Wolf–Dieter, "Antiblockiersystem und Antriebsschlupfregelungder 5. Generation," ATZ Automobiltechnische Zeitschrift, 95, vol. 11, 1993. Described in Specification.

Primary Examiner—Matthew C. Graham
(74) Attorney, Agent, or Firm—Kenyon & Kenyon

(57) ABSTRACT

A method of compensating for a temperature dependence of a coil resistance of at least one second solenoid valve of a hydraulic unit in a vehicle dynamics control is described. The method includes the following steps:

determining a first temperature of a coil of at least one first solenoid valve of the hydraulic unit, in particular a reversing valve;

determining a second temperature of the hydraulic unit, based on the first temperature, determining a third temperature of the coil of the second solenoid valve, based on the second temperature of the hydraulic unit, taking into account a temperature model of the coil of the second solenoid valve, based on the heat capacity, heat input, and heat dissipation of the coil of the second solenoid valve and/or the hydraulic unit; and compensating for the temperature dependence of the coil resistance of the at least one second solenoid valve, based on the third temperature.

11 Claims, 1 Drawing Sheet

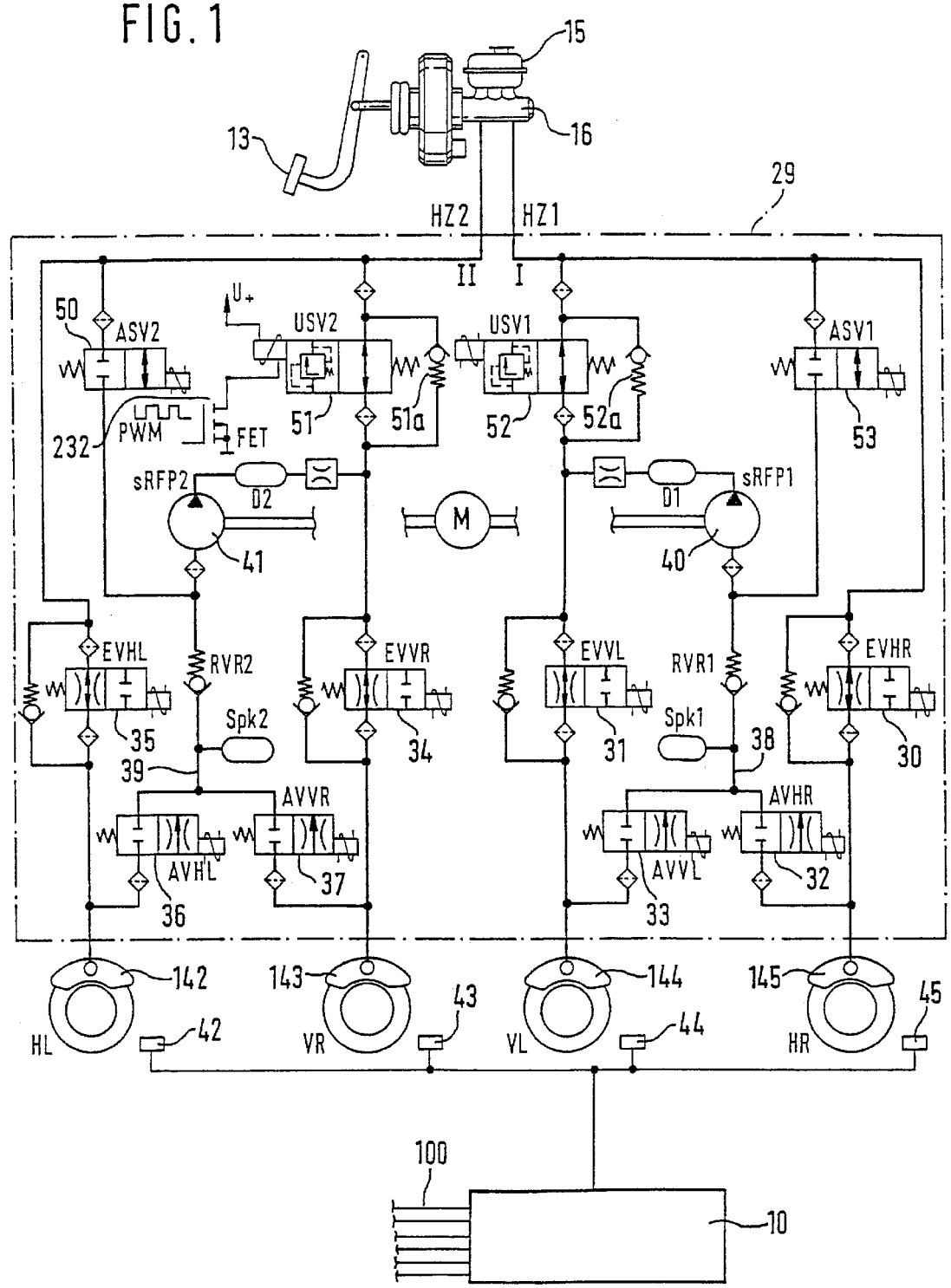

METHOD FOR COMPENSATING THE TEMPERATURE DEPENDENCE OF AN INDUCTIVE RESISTANCE OF A VALVE COIL

FIELD OF THE INVENTION

The present invention relates to a method of compensating for the temperature dependence of a coil resistance of a valve coil in a hydraulic unit, and a device for controlling the pressure in a wheel brake.

BACKGROUND OF THE INFORMATION

The main types of vehicle dynamics control systems are anti-lock brake and traction control systems (ABS/TCS). Control systems of this type are used to influence the longitudinal dynamics of the vehicle. These concepts also include control systems for motor vehicles that are used to influence the vehicle's transverse dynamics. These, for example, include control systems for controlling a quantity describing the vehicle yaw rate (VSC/ESP system). A system of this type can, among other things, influence the steering performance of motor vehicles (for example, taking into account the yaw rate, steering angle, float angle, etc.).

A brake system that includes means for performing antilock braking and traction control functions is described in the article entitled "Antiblockiersystem und Antriebsschlupfregelung der 5. Generation" (Fifth-Generation Anti-lock Brake and Traction Control System), by Wolf-Dieter Jonner, Wolfgang Maisch, Robert Mergenthaler, and Alfred Sigl, published in ATZ Autmobiltechnische Zeitschrift 95, 1993, Vol. 11. The hydraulic valves and the pump elements used to build up and relieve pressure are combined into a hydraulic unit. Particularly in the case of traction control, it is desirable to know the temperature of the brake system (the hydraulic unit and thus the hydraulic system), in particular the temperature of the coils of the respective solenoid valves. Measures for taking into account the brake system temperature are not described for the conventional brake system.

Hydraulic units used in the vehicle stability control systems listed above (ABS, TCS, ESP, VSC) provide valves that can operate in either a linear or proportional fashion. The linearly settable pressure drop across the valve according to a characteristic function depends on the valve current. However, the valve coil resistance is greatly dependent on coil temperature. Therefore, the valve current and pressure drop when setting a specific valve voltage are also greatly dependent on temperature. To avoid inaccuracies that this can produce in vehicle stability control, a conventional method measures the temperatures at the respective coils and takes into account a corresponding correction factor on the basis of the measured temperatures in controlling the coils. However, it has proven to be extremely cumbersome to measure the temperature at all valve coils.

To obtain reliable measurement results, it is especially important to use, for example, valves with current-controlled valve output stages. However, such valve output stages, and the valves equipped with them, are relatively expensive.

Corrective measures to compensate for temperature influences are conventional, for example, for solenoid valves used to control the metering of fuel in an internal combustion engine. Thus, an internal combustion engine in which the time of activation of the solenoid valve can be corrected as a function of solenoid valve temperature is described from German Patent Application No. 196 06965.

SUMMARY

An object of the present invention is to provide an easy-to-use and economical temperature detection method for solenoid valves in a hydraulic unit.

According to an embodiment of the method the temperature of a second solenoid valve is compensated for, based on a quantity of a first solenoid valve. It is no longer necessary to perform the cumbersome temperature detection at each individual solenoid valve. The solenoid valve at which the temperature is measured is the only one that must be equipped with relatively expensive temperature detection means. The remaining solenoid valves can have a less complicated and therefore more economical design.

According to another embodiment of the method, temperature influences during the activation of a second solenoid valve that is provided in a hydraulic unit located in a vehicle brake system are taken into account, i.e. eliminated, by determining at least one first quantity that describes the performance of a first solenoid valve, determining a temperature quantity that describes the temperature of the second valve as a function of the at least one first quantity, and taking into account the temperature quantity during activation of the second valve. The coil voltage, coil current, coil resistance and/or coil temperature of the first solenoid valve is suitably used as the first quantity.

According to this method for taking into account, i.e. eliminating, temperature influences, the coil temperature of the first solenoid valve does not have to be determined explicitly if a quantity describing the temperature of the second valve can be determined as a function of the coil voltage, coil current, or coil resistance, for example.

The coil temperature of the first solenoid valve is suitably determined by measuring a coil voltage and a coil current, with a temperature-dependent resistance of the coil being calculated or determined from this measurement. The coil temperature can be easily obtained on the basis of a valve coil resistance of this type, for example with the help of the conventional relationship between the resistance and temperature of copper wire, which is typically used as the coil material.

According to an advantageous embodiment of the method according to the present invention to compensate for temperature dependence, the coil current of the first solenoid valve is controlled using a current-controlled valve output stage. A current-controlled valve output stage of this type makes it possible to set the coil current very accurately so that a voltage applied to the coil can also be determined with a high degree of accuracy. The current control arrangement can be used to compensate for the temperature at this first valve. Overall, this leads to very precise resistance and temperature measurement values, respectively. The fact that, according to the present invention, only the first solenoid valve needs to be provided with a current-controlled valve output stage of this type is, specially advantageous. The remaining solenoid valves (in particular the second solenoid valve), at which the temperature is not measured directly, can be equipped with more economical, for example switching, valve output stages.

The coil voltage measured at the solenoid valve is suitably transmitted to the electronic control unit on a check-back line of the solenoid valve, for example by pulse width modulation.

BRIEF DESCRIPTION OF THE DRAWINGS

FIG. 1 shows a hydraulic circuit diagram of a vehicle brake system having a hydraulic unit.

DETAILED DESCRIPTION

The vehicle brake system shown in FIG. 1 is designed with a hydraulic unit 29. The illustrated hydraulic unit serves only to clearly represent the present invention, which can also be used in hydraulic units of a different design. The device and method according to the present invention can also be used in both a hydraulic system and an electro-hydraulic system.

FIG. 1 shows a hydraulic brake system having a diagonal arrangement of two brake circuits. A hydraulic unit 29 is shown within an area outlined by a broken line. The brake system has a pedal-operated, two-circuit main brake cylinder 16 with a pneumatic fluid reservoir 15. A first brake circuit I is connected to wheel brakes HR and VL of the right rear and left front wheels, and a second brake circuit II is connected to wheel brakes HL and VR of the left rear and right front wheels. The brake pressure can be supplied to the wheel brakes via unactivated intake valves EVHL, EVVR, EVVL, and EVHR 35, 34, 31, and 30. Activating intake valves EVHL, EVVR, EVVL, and EVHR 35, 34, 31, and 30 close the valves, making it possible to prevent a further rise in pressure in the wheel brakes. The pressure is reduced by activating discharge valves AVHL, AVVR, AVVL, and AVHR, 36, 37, 33, and 32 via check-back lines 38 and 39, using recirculating pumps sRFP1 and sRFP2 40 and 41. The recirculating pumps are driven by electric motor M. Note that recirculating pumps sRFP1 and sRFP2 40 and 41 are designed in the conventional manner as self-priming pumps (e.g. see FIGS. 4 and 5 of Unexamined German Patent No. 43 37 133 and FIG. 2 of European Patent No. 0 538600. This means that these recirculating pumps can deliver brake fluid even without admission pressure. A suction valve ASV1 and ASV2 53 and 50 as well as a non-return valve RVR1 and RVR2 are provided for each recirculating pump sRFP1 and sRFP2 40 and 41. Isolation from the admission pressure circuit can be accomplished by activating reversing valves USV and USV2 52 and 51. Accumulators Spk1 and Spk2 and damper chambers D1 and D2 are also provided.

In the interest of clarity, the drawing does not show the control connections needed between control unit 10 and the individual valves and pumps, respectively. Signals 100 are supplied to and transmitted from control unit 10.

The embodiment is a previously known one to the extent that it affects hydraulic unit 29 described above. During normal brake system operation, the solenoid valves are activated by a control unit in the usual manner to avoid locking the vehicle wheels and to control the traction of the driven wheels and the vehicle stability.

Note at this point that the use of a brake system with a diagonal arrangement is not intended to have a restricting effect.

Electric control unit 10 receives signals from wheel rotation sensors 42, 43, 44, 45 and controls pump motor M, intake valves 30, 31, 34, 35, discharge valves 32, 33, 36, 37, suction valves 50, 53, and reversing valves 51, 52.

Conventional braking takes place as usual by actuating master brake cylinder 16, which communicates with wheel brake cylinders 142, 143, 144, 145 (illustrated schematically) through normally open intake valves 30, 31, 34, 35.

To achieve anti-lock braking control, pump motor M is activated when one of the vehicle wheels is in danger of locking, thus setting corresponding recirculating pump 40, 41 in motion. If, for example, front wheel VL is showing a tendency to lock, intake valve 31 assigned to it is closed briefly at least once, thus stopping any further pressure buildup. Opening discharge valve 33 causes recirculating pump 40, to which wheel brake cylinder 144 of front wheel VL is connected, to discharge brake fluid from wheel brake cylinder 144, which produces a drop in the brake fluid pressure in wheel brake cylinder 144 and reduces the braking force at front wheel VL. The discharged brake fluid is supplied to main brake cylinder 16 through open reversing valve 52. If intake valve 31 of vehicle wheel VL that is showing a tendency to lock is opened again, and discharge valve 33 closed, the brake fluid pressure in its wheel brake cylinder 144 increases again.

Reversing valves 51, 52 are linearly operating solenoid valves in which the linearly settable pressure drop according to a specific function depends on the available valve current. The valve output stage provided for this purpose is described below. The valve coil resistance of reversing valve 51, 52, however, is highly dependent on temperature. The valve current and pressure drop at reversing valve 51, 52 thus is also highly temperature dependent when a specific valve voltage is set. A non-return valve 51a, 52a is parallel-connected to each reversing valve 51, 52.

In ABS/TCS and ESP/VSC systems, with continuous pressure control (CPC), the wheel brake pressure in the wheel having the higher brake pressure is adjusted in the brake circuit using the continuously controlled pressure drop across reversing valve 51, 52. Suction valves (ASV) 50, 53 and/or high-pressure cutoff valves (HSV), if present remain open for the entire duration of control. In addition, the intake valve of the wheel having the higher wheel brake pressure in the brake circuit is always open, while the discharge valve is always closed. The wheel brake pressure in the wheel having the lower wheel brake pressure in the brake circuit is adjusted along with the linearly set pressure drop via the intake valve of this wheel, i.e. this wheel pressure is equal to the difference between the pressure drop across reversing valve 51, 52 and the pressure difference across this intake valve.

To provide continuous pressure control, reversing valves 51, 52 each have a current-controlled valve output stage 232. In the interest of clarity, FIG. 1 shows this valve output stage only for reversing valve 51. A pulse-width-modulated (PWM) signal controls a field-effect transistor connected to a battery voltage $U_+$. The arrangement for controlling the PWM signal to set a constant valve current is not specifically illustrated. If the valve voltage actually set by the output stage in a valve output stage 232 of this type can be detected in control unit 10, the valve coil resistance of reversing valves 51 and 52, respectively, can be calculated in this unit on the basis of the valve current and valve voltage by applying Ohm's Law. Alternatively, if only the pulse width ratio of the actual valve control signal can be detected instead of the valve voltage in control unit 10, the valve voltage needed for determining valve resistance can be calculated from a supply voltage (to be measured) and the pulse width ratio of the valve control signal.

On the whole, the valve coil resistance in current-controlled valve output stages can be very accurately measured, making it possible to very accurately obtain the coil temperature with the help of the conventional relationship between the resistance and temperature of the coil material, for example copper wire.

Because the current flowing through the coil of reversing valve 51, 52, the voltage applied to the coil, and thus also the power are generally known at any time, together with the coil temperature, the temperature of hydraulic unit 29 can be estimated using a temperature model of the valve coil. For example, a temperature model of the valve coil takes into account the heat capacity as well as the valve coil heat dissipation and input (inverted temperature model).

If the temperature of hydraulic unit 29 is known, corresponding temperature models of the remaining valves, for example intake valves 30, 31, 34, 35 and discharge valves i.e. ASVs, can be used to determine the temperatures of the valve coils of these remaining valves. These temperature models also advantageously take into account the heat capacity as well as the heat dissipation and input of the corresponding valve coil, i.e. corresponding valve. It is also possible to take into account the heat capacity, heat dissipation and input of the hydraulic unit.

Using a thus determined coil temperature of intake valves 30, 31, 34, 35, for example, electronic control unit 10 can compensate for the temperature dependence of the coil resistance. As a result, it is not necessary to provide current control at the intake valves, i.e. a current-controlled output stage, for intake valves 30, 31, 34, 35. Both intake valves 30, 31, 34, 35 and the discharge valves, i.e. ASVs, can thus be equipped with more economical (switching) valve output stages.

The above-described temperature determination of the coils of reversing valve 51, 52 as well as the temperature calculation for the hydraulic unit and the coils of the remaining valves are suitably carried out in electronic control unit 10. The current value to which reversing valve 51, 52 is presently adjusted is stored in control unit 10. The valve voltage applied to the valve coil of reversing valve 51, 52 is also transmitted to control unit 10, for example on an existing check-back line of the reversing valve. This transmission can take place, for example, by pulse-width modulation. The valve voltage signal to be transmitted suitably receives the same pulse width modulation used to control reversing valve 51, 52.

The temperature of hydraulic unit 29 can then be calculated in control unit 10, as described.

Taking into account the heat capacity and instantaneous heat dissipation and input, respectively, of intake valves 30, 31, 34, 35, the coil temperature of these valves is also calculated in the electronic control unit. Based on the measured temperature of intake valves 30, 31, 34, 35, electronic control unit 10 is able to compensate for the temperature dependence of the coil resistances of intake valves 30, 31, 34, 35 when intake valves 30, 31, 34, 35 are activated.

Note that reversing valve 51, 52 must be activated to determine its coil temperature. This can be done both during ABS/TCS or VSC/ESP control as well as without activating the recirculating pump, i.e. without any pressure in the hydraulic unit.

Knowledge of the hydraulic unit temperature further improves traction control at extreme temperatures, due to the ability to correct different temperature sensitivities of the wheel pressure (e.g. in the valve output stage or through brake fluid viscosity).

Note that a hydraulic unit usually includes multiple identical valves that perform the same function or have the same arrangement in the hydraulic unit (for example, intake valves and discharge valves, that are each assigned to the same brake circuit). In the object according to the present invention, the definition of the first and second valves follows the function or arrangement. In the specific example, the first valve refers to one or both reversing valves and the second valve to one or multiple or all intake valves. Similarly, it is possible, for example, to use the intake valve of the left front wheel as the first valve and the intake valve of the right rear wheel as the second valve, i.e. to use a first and a second valve that have the same function or arrangement.

What is claimed is:

1. A method of compensating for a temperature dependence of a coil resistance of at least one second solenoid valve in a hydraulic unit of a vehicle brake system, the method comprising the steps of:
    determining a first temperature of a coil of at least one first solenoid valve of the hydraulic unit;
    determining a second temperature of the hydraulic unit as a function of the first temperature and a first temperature model of the coil of the at least one first solenoid valve, the first temperature model being a function of heat capacity, heat input and heat dissipation of at least one of: the coil of the at least one first solenoid valve and the hydraulic unit; and
    determining a third temperature of a coil of the at least one second solenoid valve as a function of the second temperature and a second temperature model of the coil of the at least one second solenoid valve, the second temperature model being a function of heat capacity, heat input, and heat dissipation of at least one of: the coil of the at least one second solenoid valve and the hydraulic unit, the temperature dependence of the coil resistance of the at least one second solenoid valve being compensated for as a function of the third temperature.

2. The method according to claim 1, wherein:
    the at least one first solenoid valve is a reversing valve.

3. The method according to claim 1, further comprising the steps of:
    measuring a coil current and a coil voltage to determine the first temperature of the at least one first solenoid valve; and
    calculating a temperature-dependent resistance of the coil of the at least one first solenoid valve from the measured coil voltage and the measured coil current.

4. The method according to claim 3, further comprising the step of:
    controlling the coil current by a current-controlled valve output state of the at least one first solenoid valve.

5. The method according to claim 3, further comprising the step of:
    transmitting the measured coil voltage over a check-back line of the at least one first solenoid valve to an electronic control unit.

6. The method according to claim 5, wherein:
    the measured coil voltage is transmitted using pulse width modulation.

7. A method for one of compensating for and eliminating temperature influences when driving a second solenoid valve in a hydraulic unit of a vehicle braking system, comprising the steps of:
    determining at least one first quantity describing the performance of a first solenoid valve; and
    determining a temperature quantity describing a temperature of the second solenoid valve as a function of the at least one first quantity, and the temperature quantity being compensated for when driving the second solenoid valve.

8. The method according to claim 7, wherein:
    the at least one first quantity includes at least one of a coil voltage, a coil current, a coil resistance and a coil temperature of the first solenoid valve.

9. The device for controlling pressure in at least one wheel brake, comprising:
    at least one first solenoid valve arranged in a hydraulic unit;

at least one second solenoid valve arranged in the hydraulic unit;

an electronic control unit controlling the at least one first solenoid valve and the at least one second solenoid valve, wherein:

the electronic control unit determines a first temperature of a coil of the at least one first solenoid valve, a second temperature of the hydraulic unit as a function of the first temperature, and a third temperature of a coil of the at least one second solenoid valve as a function of the second temperature; and the electronic control unit compensates for a temperature dependence of the coil of the at least one second solenoid valve as a function of the third temperature.

10. The device according to claim 9, wherein:

the at least one first solenoid valve includes a current-controlled valve output stage; and the electronic control unit determines a temperature dependent resistance of the coil of the at least one first solenoid valve by detecting a coil current and a coil voltage applied to the coil, the coil current being controlled by the current-controlled valve output stage.

11. The device according to claim 9, wherein:

the at least one first solenoid valve is a reversing valve; and the at least one second solenoid valve is an intake valve of a wheel brake cylinder.

* * * * *